(12) United States Patent
Schwarz

(10) Patent No.: US 8,618,707 B2
(45) Date of Patent: Dec. 31, 2013

(54) MAGNETIC BEARING WITH HIGH-TEMPERATURE SUPERCONDUCTOR ELEMENTS

(75) Inventor: Sergej Schwarz, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 459 days.

(21) Appl. No.: 12/999,674

(22) PCT Filed: Jun. 10, 2009

(86) PCT No.: PCT/DE2009/000813
§ 371 (c)(1),
(2), (4) Date: Dec. 17, 2010

(87) PCT Pub. No.: WO2009/152803
PCT Pub. Date: Dec. 23, 2009

(65) Prior Publication Data
US 2011/0089780 A1    Apr. 21, 2011

(30) Foreign Application Priority Data
Jun. 18, 2008    (DE) .......................... 10 2008 028 588

(51) Int. Cl.
*H02K 7/09*    (2006.01)
*F16C 39/06*    (2006.01)

(52) U.S. Cl.
USPC ...................................................... 310/90.5

(58) Field of Classification Search
USPC ........................................................ 310/90.5
See application file for complete search history.

(56) References Cited

U.S. PATENT DOCUMENTS

| | | | | |
|---|---|---|---|---|
| 5,196,748 A * | 3/1993 | Rigney | .......................... | 310/90.5 |
| 5,256,637 A | 10/1993 | Rao | | |
| 5,315,197 A | 5/1994 | Meeks | | |
| 5,517,071 A * | 5/1996 | Moon | .......................... | 310/90.5 |
| 2004/0017117 A1 | 1/2004 | Kwon et al. | | |

FOREIGN PATENT DOCUMENTS

| | | |
|---|---|---|
| DE | 44 36 831 A1 | 6/1995 |
| DE | 69227161 T2 | 5/1999 |
| DE | 102 36 471 A1 | 5/2003 |
| EP | 1835188 A1 | 9/2007 |
| EP | 1884671 A1 | 2/2008 |
| JP | 57083141 A | 5/1982 |
| JP | 1003320 A | 1/1989 |
| JP | 1026018 A | 1/1989 |
| JP | 1030920 A | 2/1989 |
| JP | 1055038 A | 3/1989 |
| JP | 1141222 A | 6/1989 |
| JP | 1141224 A | 6/1989 |
| JP | 1203715 A | 8/1989 |
| JP | H06200942 A | 7/1994 |
| JP | 7091447 A | 4/1995 |
| JP | H07229517 A | 8/1995 |
| JP | 7293564 A | 11/1995 |
| JP | 10306824 A | 11/1998 |
| JP | 2005133913 A | 5/2005 |
| WO | 2008036073 A2 | 3/2008 |

* cited by examiner

*Primary Examiner* — Tran Nguyen
*Assistant Examiner* — David Scheuermann
(74) *Attorney, Agent, or Firm* — Lucas & Mercanti, LLP

(57) ABSTRACT

A magnetic bearing with high-temperature superconductor elements which has a stator and a rotor, which is held such that it can rotate with respect to the stator and is mounted in an axially and radially self-regulating manner in the stator. A body of a Type-2 superconductor, in particular a high-temperature superconductor, is provided on the rotor. The stator has a coil of a superconducting material.

9 Claims, 1 Drawing Sheet

MAGNETIC BEARING WITH HIGH-TEMPERATURE SUPERCONDUCTOR ELEMENTS

This application is a 371 of PCT/DE2009/000813 filed Jun. 10, 2009, which in turn claims the priority of DE 10 2008 028 588.9 filed Jun. 18, 2008, the priority of both applications is hereby claimed and both applications are incorporated by reference herein.

FIELD OF THE INVENTION

The invention relates to a magnetic bearing as claimed in claim 1 with high-temperature superconductor elements.

Magnetic bearings are known from the prior art in which a rotor is held in a stator such that it can rotate and is mounted in the axial and radial directions. Since, according to Earnshaw's theorem, it is impossible for the rotor to be mounted in the long term by the stator by means of permanent magnets alone, so-called active magnetic bearings provide continuous readjustment of the stator. Therefore, although active magnetic bearings allow the rotor to be mounted largely with low friction, allowing relatively high bearing forces to be absorbed and having relatively high stiffness, they require a large amount of open-loop and closed-loop control complexity, however.

Furthermore, magnetic bearings are known from the prior art in which either the rotor or the stator has an associated superconducting element.

JP 01141222 AA (abstract) describes a magnetic bearing in which a superconducting material is attached to a shaft section of the shaft of a rotor, and wherein the stator has two coils, which are likewise superconducting and mount the rotor radially. Two further coils composed of a superconducting material are provided for axial mounting of the rotor, as well as sensors which detect the axial and radial displacement of the rotor in the stator. The coils for axial mounting of the rotor as well as the coils for radial mounting of the rotor are actuated and regulated as a result of the measured values from the sensors. The magnetic bearing for radial mounting and for axial mounting therefore comprises two mutually independent coil systems, necessitating additional open-loop and closed-loop control for matching. Overall, the magnetic bearing requires a measurement circuit and a control circuit, as a result of which there is no self-regulation. The materials for the wires of the superconducting coils are superconducting metals or their alloys, which require very low temperatures (below about 10 K), as a result of which complex cooling must be provided, in order to allow the magnetic bearing to be operated.

JP 01030920 AA (abstract) describes a magnetic bearing in which an excitation coil is provided on the rotor, and a superconducting material is provided on the stator. If the superconducting material is in the superconducted state and the rotor stops, a direct current is produced in the excitation coil, resulting in a magnetic field which keeps the rotor at a distance from the stator. The magnetic bearing in this case acts as a self-activating safety bearing.

JP 01026018 AA (abstract) describes a magnetic bearing in which a magnet is arranged on the envelope surface of the rotor, and the stator has a high-temperature superconducting coil. If the rotor vibrates or moves away from its nominal rotation axis, eddy currents are induced in the superconducting coil, and their magnetic field exerts a restoring force on the rotor.

U.S. Pat. No. 7,012,347 B2 describes a superconducting rotor with a cooling apparatus, wherein the superconducting rotor has a superconducting field coil.

U.S. Pat. No. 5,256,637 A describes, in a first exemplary embodiment, a superconducting magnetic bearing in which superconducting coils composed of high-temperature superconducting material are provided both on the rotor and on the stator. A second exemplary embodiment provides both superconducting and normally conductive coils, wherein the superconducting coils absorb essentially static forces, and the normally conductive coils absorb dynamic forces such as vibration; for this purpose, the normally conductive coils are actuated and regulated in the same way as in an active magnetic bearing.

EP 1 884 671 A1 describes a magnetic bearing in which the rotor is mounted by means of a superconducting coil in the axial direction, and by means of a further coil in the radial direction. The further coil interacts with a ferromagnetic section, which is arranged fixed to the body of the rotor.

JP 57083141 AA (abstract) describes a magnetic bearing in which a superconducting coil is arranged on the stator, and a further superconducting coil is arranged on the rotor. The superconducting coil on the rotor changes to the superconducting state only when the rotor is being braked, as a result of which, in this case, the magnetic bearing acts as a self-activating safety bearing.

JP 07293564 AA (abstract) describes a magnetic bearing which has a magnetic restriction nozzle, which influences the flux of the magnetic field between the rotor and the stator, in order to allow the stiffness of the bearing to be set and readjusted.

DE 102 36 471 A1 describes a magnetic bearing in which a permanently magnetic element with flux guide elements is arranged on the rotor, and a high-temperature superconducting material is arranged on the stator.

JP 01203715 AA (abstract) describes a magnetic bearing in which a wire composed of a superconducting material is part of a stator which supports a rotor which has a permanently magnetic section.

JP 01055038 AA (abstract) describes an axial magnetic bearing, in which the rotor has a coil, and wherein the stator has a superconductor composed of a metallic alloy. In this case, the Meissner-Ochsenfeld effect results in a repulsion force between the magnetic field of the coil of the rotor, and the superconducting stator.

EP 1 835 188 A1 describes a magnetic bearing in which permanently magnetic segments, which are movable radially, are arranged on the rotor, and in which the stator is formed from a high-temperature superconducting material, in particular ceramic material, which has a cylindrical shape overall.

JP 07091447 AA (abstract) describes a magnetic bearing which is supported radially by means of an interaction between permanent magnets, and axially by means of an interaction between permanent magnets and superconductors. In this case, the permanent magnets are arranged on the rotor, and the superconductors are arranged on the stator.

JP 10306824 AA (abstract) describes an axially acting magnetic bearing, in which a superconductor is arranged on the stator, and the rotor is supported radially in a gas-pressure bearing. A permanently magnetic element on the rotor interacts with the superconductor, for axial support.

DE 692 27 161 T2 describes a magnetic bearing in which permanent magnets are attached to the rotor and interact with superconducting sections on the stator so as to provide a radial and axial bearing.

Superconducting coils and wires are known in a general form from WO 2008/036073 A2, in which, in particular, the core material of the coils and wires is a ceramic-based high-temperature superconductor.

OBJECT OF THE INVENTION

The object of the invention is to specify a magnetic bearing with high-temperature superconductor elements, which has a high load-bearing capability and stiffness and does not require additional active regulation.

SUMMARY OF THE INVENTION

According to the invention, this object is achieved by a magnetic bearing as claimed in claim 1, in particular by use as claimed in claim 8 of a coil with a core composed of a high-temperature superconducting ceramic material as the stator in a magnetic bearing.

The coil composed of the high-temperature superconducting material as the stator of the magnetic bearing allows a high current density, as a result of which a strong magnetic field is formed between the stator and the rotor.

In this magnetic field, the type-2 superconductor, in particular the body of the high-temperature superconductor on the rotor, only incompletely exhibits the Meissner-Ochsenfeld effect; specifically, the magnetic field enters the body of the type-2 conductor in places in the form of normally conductive flux vortices, which are surrounded by superconducting areas. When the rotor moves relative to the magnetic field, the vortices move until they are retained on defects in the body (so-called pinning). The vortices which are retained then impede further radial or axial movement of the rotor in the stator, thus resulting in a stable, self-aligning bearing, because the holding forces of the vortices which are retained become stronger the greater the extent to which the rotor is moved and the more vortices which are present. The number of vortices increases when the magnetic field acting at the location of the body of the type-2 superconductor becomes stronger because of the superconducting coils, that is to say in particular when the rotor is moved toward the stator, that is to say specifically when additional forces deflect the rotor from its desired position relative to the stator.

Overall, this results in the rotor being mounted in a self-controlling and self-regulating manner with respect to the stator, wherein the superconducting coils of the stator, in particular when using a coil with a core composed of high-temperature superconducting ceramic material for the stator in the magnetic bearing, the particularly high critical current density of the high-temperature superconducting ceramic core becomes effective, on the basis of which a particularly strong magnetic field is created between the stator and the rotor, which in turn, even in the static case, produces a large number of vortices in the superconducting body on the rotor. In particular, the coils composed of high-temperature superconducting ceramic can produce magnetic fields which cannot be achieved by normally conductive coils and/or by means of permanent magnets on their own.

The material of the body of the type-2 superconductor on the rotor, and particularly preferably also the material of the core of the superconducting coil of the stator, is a high-temperature superconductor, as currently known for ceramic-based high-temperature superconductors. The high transition temperatures of high-temperature superconductors above the boiling point of liquid nitrogen, allow effective, energy-saving cooling of the magnetic bearing.

The transition temperature of the material of the body of the type-2 superconductor on the rotor and of the material of the coil are preferably comparable, thus allowing a common cooling circuit to be provided for the rotor and the stator.

The stator preferably comprises a ferromagnet. In this case, the magnetic field of the ferromagnet and the field of the coil are superimposed, as a result of which the magnetic field of the coil is amplified by the magnetic field of the ferromagnet, for example on the end sections of the rotor, on which deflections from the rest position occur to a greater extent, and additional vortices in the body on the rotor allow particularly high holding force on the end sections.

It is self-evident that an additional coil may also be provided instead of or in addition to the ferromagnet, which coil is normally conductive, or is likewise superconducting, and whose magnetic field is superimposing and modulating the magnetic field of the coil of the stator at the location of the body of the type-2 superconductor.

The stator particularly preferably comprises a plurality of coil turns, in which case a ferromagnetic material is in each case arranged between two adjacent coil turns. The at least one ferromagnet between the at least two coil turns in this case modulates the essentially radially homogeneous magnetic field of the at least two coil turns such that the resultant magnetic field is inhomogeneous in the radial direction. The inhomogeneity, particularly in the radial direction, then makes it possible to react to changes in the radial position of the rotor relative to the stator with an increased restoring force, thus resulting in the magnetic bearing having an improved stiffness overall.

Further advantages and features of the invention become evident from the following description of two exemplary embodiments, and from the dependent claims.

The invention is described and explained in more detail in the following text with reference to the attached drawings.

DETAILED DESCRIPTION OF THE DRAWING

Figure 1:
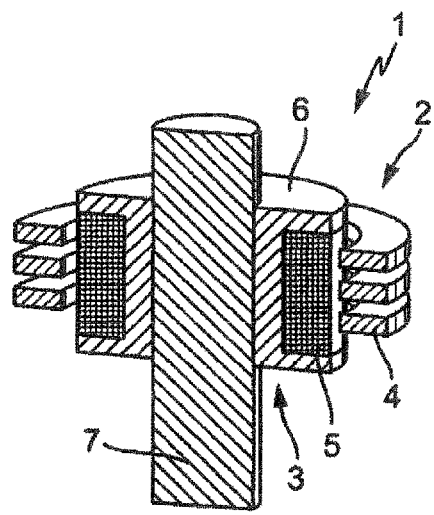
FIG. 1 shows a schematic cross-sectional view of a first exemplary embodiment of a magnetic bearing according to the invention.

FIG. 1 shows a magnetic bearing 1 with a stator 2 and a rotor 3, wherein the rotor 3 is mounted axially and radially in the stator 2, such that it can rotate with respect to the stator 2. The stator 2 has a coil 4 with a current-carrying area, the core, composed of a superconducting material, in which case only three coil turns of the coil 4 are illustrated, schematically.

The rotor 3 has an annular body 5, which surrounds the rotor 3 and is composed of a type-2 superconductor, in particular of a high-temperature superconductor, specifically from a ceramic material such as YBCO. By way of example, the material of the body 5 corresponds to the material of the core of the coil 4, as a result of which the coil 4 and the body 5 have essentially the same transition temperature. The body 5 is arranged in a seat 6 composed of a non-magnetic material, with the seat 6 being attached to a shaft 7, which is mounted in the stator 2. The radial extent of the body 5 is chosen such that the magnetic field of the coil 4 can enter the body 5 to such an extent that a self-stabilizing effect can be formed, that is to say in particular such that flux vortices of the magnetic field of the coil 4 are formed in the body 5. Furthermore, the body 5 has crystalline defects on which the vortices are retained, such that the vortices do not move in the body 5 without resistance.

The coil 4 is in a superconducting state and carries a comparatively high current which is carried essentially without any losses in the coil 4 and produces a strong magnetic field at the location of the body 5 on the rotor 3. The body 5 is cooled by a cooling apparatus, which is not illustrated, below the transition temperature of the YBCO, as a result of which the body 5 becomes superconducting. The previously cooled and superconducting coil 4 forms a magnetic field in the area of the body 5, which to this extent is inhomogeneous and has a component at right angles to the surface of the body 5, such that vortices are formed in the body 5, which are spatially fixed relative to the stator 2 if the rotor 3 moves further, and provide an obstruction to the movement.

The coil 4 on the stator 2 of the magnetic bearing in this case has the effect of allowing not only radial bearing but also axial bearing of the rotor 3, via the pinning of the vortices in the body 5 of the type-2 superconductor on the rotor 3. There is therefore no need for any further apparatus in particular for axial bearing of the rotor 3 in the stator 2, in particular for one or more normally conductive or superconducting coils for exclusively axial bearing of the rotor 3.

Figure 2:
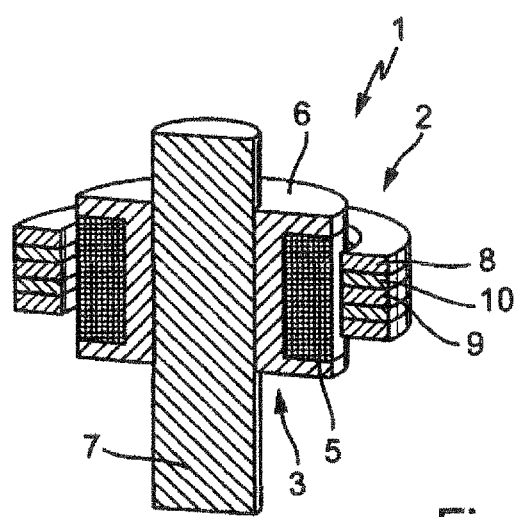
FIG. 2 shows a schematic cross-sectional view of a second exemplary embodiment of a magnetic bearing according to the invention.

In the second exemplary embodiment, which is illustrated in FIG. 2, the same reference numbers denote identical parts or parts having a corresponding technical effect. The aim of the following text is, in particular, to describe the differences from the first exemplary embodiment.

The rotor 3 in FIG. 2 corresponds to the rotor discussed above with reference to FIG. 1. In addition, the coil 4 of the stator 2 in FIG. 2 has a ferromagnet 10 between two adjacent coil turns 8, 9, for example a ferromagnet composed of iron, whose magnetic field is superimposed on the magnetic field of the coil 4, thus increasing a radial gradient of the magnetic field. This increased radial gradient of the magnetic field of the coil 4 results in a stronger restoring force, when the rotor 3 is deflected from the illustrated nominal position relative to the stator 2.

The second exemplary embodiment, illustrated in FIG. 2, is therefore stiffer than the first exemplary embodiment illustrated in FIG. 1.

In the second exemplary embodiment, a ferromagnet is in each case arranged between two respectively adjacent coil turns. It is self-evident that it is not absolutely essential to provide for the ferromagnet to be arranged between the next coil turn, and it is also possible for the ferromagnet in each case to be arranged adjacent to the next-but-one, third, fourth, etc. coil turn, in order to increase the radial gradient. It is also self-evident that a ferromagnet is also provided only on specific coil turns, specifically on the end sections of the coil. If two or more ferromagnets are provided, it is also self-evident that the dimensioning of the ferromagnets need not be the same, and in particular stronger ferromagnets can be provided at the ends of the coil 4.

In the second exemplary embodiment, described above, the ferromagnet 10 was formed by a ferromagnetic body with permanent magnetization. It is self-evident that the ferromagnet 10 can likewise be formed by a further coil, for example composed of a normally conductive material, which is provided in addition to the superconducting coil 4. The distance between the turns of this additional coil and the rotor 3 may vary along the extent of the additional coil as a result of which the additional coil produces an inhomogeneous magnetic field in addition to the superconducting coil 4. It is self-evident that the additional coil can likewise be designed to be superconducting.

In the two exemplary embodiments described above, the superconducting coil 4 was formed by a single coil. It is self-evident that two or more superconducting coils may be provided, which are adjacent along the extent of the rotor 3, or are arranged one inside the other, at least in places, without touching. In the area in which the two superconducting coils are arranged one inside the other, the magnetic field acting on the rotor 3 in the body 5 of the type-2 superconductor is increased; specifically, the resultant magnetic field of the two or more superconducting coils can produce a radially inhomogeneous resultant magnetic field, which improves the stiffness and the load bearing capability of the magnetic bearing.

In the exemplary embodiments described above, the seat 6 is formed from a non-magnetic material. It is self-evident that the seat 6 may be formed from a magnetic material or a material which can be magnetized, in order to modulate the magnetic field of the superconducting coil 4 such that the magnetic field has a component which is as perpendicular as possible to the surface of the body 5, thus facilitating the forming of vortices in the body 5.

| List of Reference Symbols | |
|---|---|
| 1 | Magnetic bearing |
| 2 | Stator |
| 3 | Rotor |
| 4 | Coil |
| 5 | Body |
| 6 | Seat |
| 7 | Shaft |
| 8 | First coil turn |
| 9 | Second coil turn |
| 10 | Ferromagnet |

The invention claimed is:

1. A magnetic bearing with high-temperature superconductor elements, comprising:
   a stator; and
   a rotor which is held such that it can rotate with respect to the stator and k mounted in a self-regulating manner axially and radially in the stator,
   wherein a body comprising a type-2 superconductor is provided on the rotor, the body having a cylindrical outermost surface between two axial ends, and
   wherein the stator has a coil composed of a superconducting material, the coil arranged between the two axial ends and surrounding the cylindrical outermost surface, the coil forming a magnetic field in an area of the body, and
   the body having crystalline defects on which flux vortices of the magnetic field of the coil are retained, whereby the magnetic bearing has the effect of an axial bearing and a radial bearing.

2. The magnetic bearing as claimed in claim 1, wherein the superconducting material of the coil is a high-temperature superconductor.

3. The magnetic bearing as claimed in claim 1, wherein the material of the body of the type-2 superconductor on the rotor, and the material of the coil, are a high-temperature superconducting ceramic.

4. The magnetic bearing as claimed in claim 1, wherein a transition temperature of the material of the body of the rotor and of the material of the coil is essentially the same.

5. The magnetic bearing as claimed in claim 1, wherein the stator has a ferromagnet.

6. The magnetic bearing as claimed in claim 5, wherein the stator has a plurality of coil turns, and wherein the ferromagnet is arranged between two coil turns.

7. The magnetic bearing as claimed in claim 1, wherein the stator has an additional coil.

8. The magnetic bearing as claimed in claim 1, wherein the type-2 superconductor is a high-temperature superconductor.

9. The magnetic bearing as claimed in claim 1, wherein the rotor further comprises a seat made of non-magnetic material, the at being attached or attachable to a shaft, and the body being arranged in the seat.

* * * * *